United States Patent [19]

Sterzel et al.

[11] 4,145,331

[45] Mar. 20, 1979

[54] THERMOPLASTIC POLYESTER MOLDING COMPOSITIONS WITH IMPROVED HEAT DISTORTION POINT

[75] Inventors: Hans-Josef Sterzel, Dannstadt-Schauernheim; Karl Schlichting, Bobenheim-Roxheim; Wolfgang Seydl, Frankenthal, all of Fed. Rep. of Germany

[73] Assignee: BASF Aktiengesellschaft, Ludwigshafen, Fed. Rep. of Germany

[21] Appl. No.: 858,745

[22] Filed: Dec. 8, 1977

[30] Foreign Application Priority Data

Dec. 29, 1976 [DE] Fed. Rep. of Germany ....... 2659338

[51] Int. Cl.² .......................... C08K 3/02; C08K 3/32; C08K 7/14; C08L 7/02
[52] U.S. Cl. .................................. 260/40 R; 260/873
[58] Field of Search ............................. 260/40 R, 873

[56] References Cited

U.S. PATENT DOCUMENTS

| | | | |
|---|---|---|---|
| 3,644,574 | 2/1972 | Jackson et al. | 260/873 |
| 3,852,394 | 12/1974 | Kubota et al. | 260/873 |
| 4,022,748 | 5/1977 | Schlichting et al. | 260/40 R |

*Primary Examiner*—Sandra M. Person
*Attorney, Agent, or Firm*—Keil & Witherspoon

[57] ABSTRACT

Thermoplastic polyester molding compositions with improved heat distortion point contain, per 100 parts of a linear saturated polyester, from 1 to 100 parts of a rubbery graft copolymer, from 10 to 100 parts of an α-methylstyrene/acrylonitrile copolymer, and from 0 up to 80, preferably 10 to 80 parts of a filler, especially glass fibers as the filler. They can be converted to shaped articles by extrusion or injection molding.

10 Claims, No Drawings

THERMOPLASTIC POLYESTER MOLDING COMPOSITIONS WITH IMPROVED HEAT DISTORTION POINT

U.S. Pat. No. 4,022,748 discloses thermoplastic polyester molding compositions comprising:

(A) 100 parts by weight of a linear saturated polyester of an aromatic dicarboxylic acid and saturated aliphatic or cycloaliphatic diols and (B) from 1 to 25 parts by weight of an elastomeric graft copolymer which has a glass transition temperature of below −20° C., with or without (C) from 10 to 80 parts by weight of fillers.

The principal thermoplastic polyester molding compositions which have found use in injection molding and extrusion are polybutylene terephthalate and polyethylene terephthalate. These polyesters have a sustained heat resistance of from 110° to 130° C. and hence withstand heat exposure better than other thermoplastics, e.g. polystyrenes, polyethylene and polyvinyl chloride. The crystallite melting points, which are 220° C. for polybutylene terephthalate and 250° C. for polyethylene terephthalate, are relatively high; however, the large temperature interval up to the melting point of the molding compositions cannot be utilized, even briefly, if the moldings in question are highly stressed. The relatively low glass transition temperatures, namely 55° C. and 80° C. respectively, are responsible for a substantial decrease in strength above these temperatures. The modulus of elasticity, flexural strength and tensile strength are greatly reduced under these conditions. For applications where moldings are highly stressed, these figures represent the limit of temperature which the moldings will withstand.

It is an object of the present invention to improve the heat distortion point of thermoplastic polyester compositions.

Attempts have already been made to improve the heat distortion point of thermoplastic polyesters by admixture of bisphenol-A polycarbonates. The polycarbonate disperses surprisingly well in the polyester melt if both polymers are mixed in the melt, as is conventionally the case. However, it is just this apparent advantage which is responsible for a less than proportional improvement in heat distortion point. This is because the mixture is a concentrated solution of polyester in polycarbonate as the solvent, from which solution the polyester crystallizes out more slowly, on cooling, than does the pure polyester under identical conditions. The polyester present in the mixture has a lower crystalline content after cooling, and as a result the heat distortion point of the mixture is lower than expected.

It was therefore surprising that the heat distortion point of thermoplastic polyesters is substantially improved if the polyesters are mixed, in the melt, with a copolymer of α-methylstyrene and acrylonitrile, though the glass transition range of the copolymer, being 120°–135° C., is lower than that of the bisphenol-A polycarbonate, which is about 150° C.

In order to compensate for losses in toughness, an elastomeric graft copolymer which has a glass transition temperature of below −30° C. is also admixed.

Accordingly, the thermoplastic polyester molding compositions of improved heat distortion point, provided by the invention, contain, per (A) 100 parts by weight of thermoplastic polyester, (B) from 1 to 100 parts by weight of an elastomeric graft copolymer which has a glass transition temperature of below −20° C., (C) from 10 to 100 parts by weight of a copolymer of α-methylstyrene and acrylonitrile, and if desired (D) from 10 to 80 parts by weight of filler.

The linear saturated polyester used (component A) is preferably polybutylene terephthalate. Modified polybutylene terephthalates which, in addition to terephthalic acid, contain other aromatic or aliphatic dicarboxylic acids as base units, e.g. naphthalene-2,6-dicarboxylic acid or adipic acid, may also be used. Modified polybutylene terephthalates which, in addition to butane-1,4-diol contain other aliphatic diols, e.g. neopentylglycol, ethylene glycol or hexane-1,6-diol, may also be employed.

The polyesters should have a relative viscosity in dl/g (measured on an 0.5% strength solution in a 60:40 phenol/o-dichlorobenzene mixture at 25° C.) of between 1.44 and 1.95, preferably between 1.50 and 1.75.

Graft copolymers (component B) mean products which may be obtained by polymerizing monomers in the presence of prepolymers, a substantial part of the monomer being grafted onto the prepolymer molecule. The manufacture of such graft copolymers has been disclosed in principle; cf., in particular, R. J. Ceresa, Block and Graft Copolymers (Butterworth, London, 1962).

In principle, all graft copolymers may be used for the purposes of the invention, provided they have elastomeric properties and provided their glass transition temperature is below −20° C., especially from −150° to −20° C. and preferably from −80° to −30° C. The glass transition temperature can be determined by the methods described by B. Vollmert, Grundriss der Makromolekularen Chemie, Springer-Verlag, Heidelberg, 1962, pages 406–410.

To manufacture the elastomeric graft copolymers to be used as additives in accordance with the invention, it is possible to start, for example, from a prepolymer 1) which has been manufactured from (a) 10–99 percent by weight of an acrylic ester of an alcohol of 1 to 15 carbon atoms and (b) 1–90 percent by weight of a monomer which carries two olefinic double bonds, with or without (c) up to 25 percent by weight of further monomers.

This prepolymer is then grafted with the components (2), (3) and (4) described below, i.e. these components are polymerized in the presence of the prepolymer (1). For example, advantageous graft copolymers are obtained by using prepolymers (1) of (a) from 10 to 99 percent by weight, preferably from 30 to 98 percent by weight, especially from 50 to 98 percent by weight, of an acrylic ester of an alcohol of 1 to 10 carbon atoms, preferably of 4 to 8 carbon atoms, e.g. n-butyl acrylate, octyl acrylate or ethylhexyl acrylate and (b) from 1 to 90 percent by weight, preferably from 2 to 70 percent by weight, especially from 2 to 50 percent by weight, of a monomer which carries two olefinic double bonds, e.g. butadiene, vinylcyclohexene, cycloocta-1,5-diene and/or esters derived from unsaturated alcohols, e.g. vinyl acrylate, allyl acrylate, tricyclodecenyl acrylate and/or diallyl phthalate, with or without (c) up to 25 percent by weight of other conventional monomers, e.g. vinyl ethers, vinyl esters, vinyl halides or vinyl-substituted heterocyclic compounds, e.g. vinylpyrrolidone (the percentages under a) to c) adding up to 100).

Component (b) is essential for the subsequent grafting. The double bonds introduced into the prepolymer through (b) serve, to varying degrees depending on the reactivity, as grafting points, at which the polymer molecule subsequently continues to grow.

Onto such a prepolymer (1) there are now grafted (per 100 parts of prepolymer)

(2) from 10 to 85 parts by weight, especially from 20 to 70 parts by weight, of styrene and/or a methacrylic acid ester and/or methacrylic acid or acrylic acid, with or without (3) up to 35 parts by weight of acrylonitrile or methacrylonitrile and with or without (4) up to 20 parts by weight of further monomers, e.g. acrylic esters, vinyl esters, vinyl ethers, vinyl halides or vinyl-substituted heterocyclic compounds, e.g. vinylpyrrolidone.

The presence of a substantial number of polar groups in the graft copolymers is advantageous. Preferably, products which contain more than 10 percent by weight of units derived from acrylic or methacrylic acid esters and acrylonitrile or methacrylonitrile as monomeric units are selected. If the content of acrylic or methacrylic esters exceeds 70 percent by weight, it is advantageous to dispense with the presence of acrylonitrile or methacrylonitrile as copolymerized units.

The prepolymers and the graft copolymers are manufactured in the conventional manner, preferably by emulsion polymerization with conventional free radical initiators, emulsifiers and regulators.

Suitable reinforcing fillers (component D) are those which increase the rigidity of the polyesters. Amongst these, fibrous materials are preferred, in particular glass fibers made from lowalkali E-glass, having a fiber diameter of from 8 to 14 μm, the length of the glass fibers in the finished injection molding being from 0.01 mm to 0.5 mm. The glass fibers may be employed as rovings or as chopped or milled glass fibers, and may be provided with a suitable finish and an adhesion promoter or promoter system based on silanes. The amount of reinforcing fillers is advantageously from 5 to 60 percent by weight, especially from 10 to 40 percent by weight.

However, other fibrous reinforcing materials, e.g. carbon fibers, K titanate single-crystal fibers, gypsum fibers, aluminum oxide fibers or asbestos may also be incorporated. Non-fibrous fillers, e.g. glass beads, hollow glass beads, chalk, quartzes and natural or calcined kaolins are further preferred fillers, as are combinations of these materials with glass fibers. Like the glass fibers, these latter fillers may be provided with a finish and/or an adhesion promoter or adhesion promoter system.

The copolymer C preferably comprises from 50 to 95 percent by weight of α-methylstyrene and from 5 to 50 percent by weight of acrylonitrile. A particularly preferred copolymer contains 70 percent by weight of α-methylstyrene and 30 percent by weight of acrylonitrile. The copolymer preferably has an intrinsic viscosity of from 35 to 70 cm$^3$/g, as measured on an 0.5% strength solution in dimethylformamide at 25° C.

We have found, surprisingly, that solvents which swell or dissolve copolymers of α-methylstyrene and acrylonitrile, e.g. aromatic hydrocarbons, fuels or turpentine oil, do not attack the compositions according to the invention provided the weight ratio of polyester to α-methylstyrene/acrylonitrile copolymer is not less than 0.7. This behavior is a very important factor in the broad range of uses of the products.

The additives do not reduce the high rate of crystallization of polybutylene terephthalate. Nevertheless it may be useful, for certain purposes, to add conventional materials, e.g. calcium carbonate, aluminum silicates or talc, as nucleating agents. These may be added at various stages of the process of manufacture of the polyester molding compositions. For example, the nucleating agent may be added during the polycondensation, but may also be introduced conjointly with one of the additives according to the invention into the polyester.

An additional increase in impact strength is achieved, both with non-reinforced and with reinforced polyesters, by introducing diisocyanates, in addition to the stated graft rubbers, into the polymer mixture. The content of diisocyanates may be from 0.1 percent by weight to 3 percent by weight. The use of 4,4'-diphenylmethane diisocyanate is particularly advantageous.

The polyester molding compositions according to the invention may in addition contain fire-retardant additives based on elementary red phosphorus or on phosphorus compounds, but especially chlorine or bromine compounds in combination with antimony oxide, iron oxide or zinc oxide, as well as dyes and colored pigments, stabilizers against thermal, thermo-oxidative and UV degradation, waxes, lubricants and processing assistants, which ensire trouble-free extrusion and injection-molding, and antistatic agents.

The components can be premixed very simply by feeding the polyester granules, the graft copolymer powder and the other additives described above by means of belt-type metering weighers into an extruder where the polymers are fused and mixed thoroughly.

However, because of the surprisingly good compatibility of the components it is possible to process the mixture on an injection-molding machine without prior extrusion. In that case, the screw of the injection-molding machine by itself produces a homogeneous mixture.

The polyester molding composition should contain very little moisture, preferably less than 0.02 percent by weight.

The additives do not have an adverse effect on the stability of the polyesters to processing. Extrusion and injection molding of the polymer mixture may be carried out at from 230° to 280° C., with mold temperatures of from 50° to 80° C.

The molding compositions according to the invention give partially crystalline moldings which are very tough and have a very high heat distortion point. They absorb less than 0.3% of moisture, are very solvent-resistant, have a white intrinsic color and possess a high surface gloss.

The examples given in the table which follows are intended to illustrate the advantages of the polyester molding compositions of the invention over other compositions.

The heat distortion points and the level of mechanical properties are compared with unmodified polybutylene terephthalate and with polybutylene terephthalate modified with bisphenol-A polycarbonate.

The following components are employed in the examples:

(A) Polybutylene terephthalate of relative viscosity 1.65, measured on an 0.5% strength solution in a mixture of phenol and o-dichlorobenzene in the ratio of 3:2 at 25° C.

(B) A graft copolymer comprising 70 parts by weight of a prepolymer and 99 percent by weight of n-butyl acrylate and 1 percent by weight of tricyclodecenyl acrylate, onto which prepolymer have been grafted branches comprising 75 percent by weight of styrene and 25 percent by weight of acrylonitrile. The particle diameter is about 0.3 μm.

(C) A copolymer of 70 percent by weight of α-methylstyrene and 30 percent by weight of acrylonitrile, intrinsic viscosity 55 cm³/g, measured on an 0.5% strength solution in dimethylformamide at 25° C.

(PC) A bisphenol-A polycarbonate from Bayer AG, Makrolon 3100 L.

The components were mixed, in the proportions by weight shown in the table, by means of a twin-screw extruder, in the molten state at 240° C. The extruded strands were cooled by means of a water bath, and granulated.

The dried granules were converted on an injection-molding machine to the moldings required for the tests described below. Molding was carried out with a material temperature of 250° C. and a mold temperature of 80° C.

The following tests were carried out:

Determination of the heat distortion point according to ISO/R 75, test method A (DIN 53,461), bending stress 18.5 kp/cm². The temperature at which the test specimen reaches a certain deflection under the said stress is determined.

Determination of the impact strength $a_N$ according to DIN 53,453.

Determination of the notched impact strength $a_K$ according to DIN 53,453.

Determination of the yield stress $\sigma_S$ according to DIN 53,455

Determination of the tensile strength $\sigma_R$ according to DIN 53,455

Determination of the tensile modulus of elasticity E according to DIN 53,457.

TABLE

| Example No. | Dimension | Measured properties | | | | | | | |
|---|---|---|---|---|---|---|---|---|---|
| | | 1 | 2 | 3 | 4 | 5 | 6 | 7 | 8 |
| % by weight of A | | 100 | 90 | 80 | 70 | 75 | 65 | 50 | 40 |
| % by weight of B | | — | — | — | — | 20 | 15 | 30 | 30 |
| % by weight of C | | — | — | — | — | 5 | 20 | 20 | 30 |
| % by weight of PC | | — | 10 | 20 | 30 | — | — | — | — |
| Heat distortion point | °C. | 67 | 61 | 65 | 72 | 95 | 92 | 94 | 93 |
| $a_N$ | | | | | no fracture | | | | |
| $a_K$ | Kilojoule per m² | 3.1 | 3.5 | 3.8 | 4.6 | 1.6 | 5.0 | 5.3 | 8.6 |
| $\sigma_S$ | N/mm² | 57.0 | 62.0 | 62.0 | 61.5 | 61.3 | 48.9 | 50.9 | 44.2 |
| $\sigma_R$ | N/mm² | 36.5 | 35.0 | 36.0 | 41.0 | 55.8 | 33.3 | 34.7 | 32.4 |
| E | N/mm² | 2,600 | 2,550 | 2,600 | 2,650 | 3,250 | 2,410 | 2,620 | 2,300 |

Examples 5 to 8 clearly show the superiority of the polyester molding compositions according to the invention over pure polybutylene terephthalate and over mixtures of polybutylene terephthalate with from 10 to 30 percent by weight of bisphenol-A polycarbonate.

The heat distortion point of the pure polybutylene terephthalate is raised from 67° C. to 92°–95° C. In contrast, the admixture of up to 20 percent by weight of bisphenol-A polycarbonate lowers the heat distortion point. Only on adding 30 percent by weight of polycarbonate (Example 4) is a heat distortion point of 72° C. obtained.

We claim:

1. A thermoplastic polyester molding composition which comprises
    (A) 100 parts by weight of a linear saturated polyester of an aromatic dicarboxylic acid and saturated aliphatic or cycloaliphatic diols,
    (B) from 1 to 100 parts by weight of the elastomeric graft copolymer which has a glass transition temperature of below −20° C.,
    (C) from 10 to 100 parts by weight of an α-methylstyrene/acrylonitrile copolymer, and
    (D) from 10 to 80 parts by weight of a filler.

2. A thermoplastic polyester molding composition as claimed in claim 1, which contains, as component B, a graft copolymer of
    (a) a prepolymer of from 30 to 77 percent by weight of butyl acrylate and/or ethylhexyl acrylate, from 20 to 40 percent by weight of butadiene and from 3 to 30 percent by weight of a vinyl alkyl ether, where alkyl is of 1 to 8 carbon atoms, the percentages adding up to 100, which has been manufactured by polymerizing the monomers in aqueous emulsion, and onto which have been polymerized, in emulsion,
    (b) from 10 to 50 percent by weight, based on a), of styrene or of a mixture of styrene and acrylonitrile, which contains up to 30 percent by weight of acrylonitrile.

3. A thermoplastic polyester molding composition as claimed in claim 1, which contains, as component B, a graft copolymer of
    (a) a prepolymer of from 99 to 80 percent by weight of one or more acrylic acid esters of an alcohol of 4 to 8 carbon atoms and from 1 to 20 percent by weight of the acrylic acid ester of tricyclodecenyl alcohol or other monomers with at least two separated olefinic double bonds, which has been manufactured by polymerizing the monomers in aqueous emulsion, and onto which have been polymerized, in emulsion,
    (b) from 10 to 50 percent by weight, based on a), of styrene or of a mixture of styrene and acrylonitrile, which contains up to 40 percent by weight of acrylonitrile.

4. A thermoplastic polyester molding composition as claimed in claim 1, which contains, as the filler D, glass fibers having a diameter of from 8 to 14 μm and a length of from 0.01 to 0.5 mm.

5. A thermoplastic polyester molding composition as claimed in claim 1, which contains fire-retardant chlorine-containing or bromine-containing additives in combination with antimony oxide, iron oxide or zinc oxide.

6. A thermoplastic polyester molding composition as claimed in claim 1, which contains a fire-retardant additive based on red phosphorus or phosphorus compounds.

7. A thermoplastic polyester molding composition as claimed in claim 1, wherein the copolymer C consists of from 50 to 95 percent by weight of α-methylstyrene and from 5 to 50 percent by weight of acrylonitrile and has an intrinsic viscosity of from 35 to 70 cm$^3$/g, measured on an 0.5% strength solution in dimethylformamide at 25° C.

8. A thermoplastic polyester molding composition as claimed in claim 7 containing a fibrous reinforcing filler in an amount of 5 to 60% by weight.

9. A thermoplastic polyester molding composition as claimed in claim 7 containing a fibrous reinforcing filler in an amount of 10 to 40% by weight.

10. A thermoplastic polyester molding composition as claimed in claim 8 wherein the reinforcing filler consists essentially of glass fibers having a diameter of 8 to 14 μm and a length of from 0.01 to 0.5 mm.

* * * * *

UNITED STATES PATENT AND TRADEMARK OFFICE
CERTIFICATE OF CORRECTION

PATENT NO. : 4,145,331
DATED : March 20, 1979
INVENTOR(S) : Hans-Josef Sterzel et al It is certified that error appears in the above-identified patent and that said Letters Patent are hereby corrected as shown below:

Column 6, line 11,

"10 to 80" should read -- 0 to 80 --.

Signed and Sealed this

Sixteenth Day of October 1979

[SEAL]

Attest:

RUTH C. MASON
Attesting Officer

LUTRELLE F. PARKER
Acting Commissioner of Patents and Trademarks